(12) United States Patent
John Wilson et al.

(10) Patent No.: US 11,316,577 B2
(45) Date of Patent: Apr. 26, 2022

(54) SIGNALING OF CONTROL RESOURCE SET (CORESET)

(71) Applicant: QUALCOMM Incorporated, San Diego, CA (US)

(72) Inventors: Makesh Pravin John Wilson, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 16/406,562

(22) Filed: May 8, 2019

(65) Prior Publication Data

US 2019/0349059 A1     Nov. 14, 2019

Related U.S. Application Data

(60) Provisional application No. 62/670,665, filed on May 11, 2018.

(51) Int. Cl.
*H04B 7/06* (2006.01)
*H04B 17/309* (2015.01)
(Continued)

(52) U.S. Cl.
CPC ......... *H04B 7/0695* (2013.01); *H04B 7/0626* (2013.01); *H04B 17/309* (2015.01);
(Continued)

(58) Field of Classification Search
CPC .. H04B 7/0695; H04B 7/0626; H04B 17/309; H04W 72/0453; H04W 72/085;
(Continued)

(56) References Cited

U.S. PATENT DOCUMENTS

2018/0192383 A1* 7/2018 Nam ................... H04J 11/0076
2019/0165915 A1* 5/2019 John Wilson ......... H04W 48/10
(Continued)

FOREIGN PATENT DOCUMENTS

WO    2017196612 A1    11/2017
WO    2018016907 A1    1/2018

OTHER PUBLICATIONS

International Search Report and Written Opinion—PCT/US2019/031575—ISA/EPO—dated Sep. 11, 2019.
(Continued)

*Primary Examiner* — Ashley Shivers
(74) *Attorney, Agent, or Firm* — Patterson & Sheridan, L.L.P.

(57) ABSTRACT

Methods are provided for configuring an initial CORESET and associated search space during beam management. A base station (BS) receives measurements of at least one downlink reference signal (RS) from a User Equipment (UE), wherein each of the at least one downlink RS is associated with a transmit beam. The BS selects, based on the received measurements, a transmit beam for transmitting on resources of an initial time and frequency control resource set (CORESET), wherein the initial CORESET schedules unicast Physical Downlink Data Channel (PDSCH) for the UE, wherein the initial CORESET is identified during initial access of the UE to the BS. The BS transmits information relating to the initial CORESET on the selected beam in a Medium Access Control (MAC) Control Element (MAC-CE), wherein the information is transmitted using a combination of bits in the MAC-CE, the bits configured for indicating CORESETs.

14 Claims, 11 Drawing Sheets

(51) Int. Cl.
  *H04W 72/04* (2009.01)
  *H04L 5/00* (2006.01)
  *H04W 72/08* (2009.01)

(52) U.S. Cl.
  CPC .......... *H04L 5/0048* (2013.01); *H04L 5/0053* (2013.01); *H04W 72/0453* (2013.01); *H04W 72/085* (2013.01)

(58) Field of Classification Search
  CPC .............. H04W 72/046; H04W 72/042; H04L 5/0048; H04L 5/0053; H04L 5/0091; H04L 5/0025; H04L 5/0094
  See application file for complete search history.

(56) References Cited

U.S. PATENT DOCUMENTS

2019/0200345 A1* 6/2019 Zhang ............... H04W 72/0413
2019/0306847 A1 10/2019 Seo et al.

OTHER PUBLICATIONS

Partial International Search Report—PCT/US2019/031575—ISA/EPO—dated Jul. 18, 2019.
Samsung: "On Beam Management, Measurement and Reporting" 3GPP Draft; R1-1715940, 3rd Generation Partnership Project (3GPP), Mobile Competence Centre, 650, Route Des Lucioles ; F-06921 Sophia-Antipolis Cedex, France, vol. RAN WG1, No. Nagoya, Japan; Sep. 18, 2017-Sep. 21, 2017, Sep. 17, 2017 (Sep. 17, 2017), 16 Pages, XP051339399, Retrieved from the Internet: URL: http://www.3gpp.org/ftp/Meetings_3GPP_SYNC/RAN1/Docs/ [retrieved on Sep. 17, 2017].

* cited by examiner

SIGNALING OF CONTROL RESOURCE SET (CORESET)

CROSS-REFERENCE TO RELATED APPLICATION(S)

This application claims priority to U.S. Provisional Application No. 62/670,665, entitled "SIGNALING OF CONTROL RESOURCE SET (CORESET)", filed on May 11, 2018, which is expressly incorporated by reference in its entirety.

FIELD OF THE DISCLOSURE

Aspects of the present disclosure relate to wireless communications, and more particularly, to techniques for configuring an initial control resource set (CORESET) used for initial access of a network, such as a search space associated with the initial CORESET.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or $5^{th}$ Generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication by a Base Station (BS). The method generally includes receiving measurements of at least one downlink reference signal (RS) from a User Equipment (UE), wherein each of the at least one downlink RS is associated with a transmit beam; selecting, based on the received measurements, a transmit beam for transmitting on resources of an initial time and frequency control resource set (CORESET), wherein the initial CORESET schedules unicast Physical Downlink Data Channel (PDSCH) for the UE, wherein the initial CORESET is identified during initial access of the UE to the BS; and transmitting information relating to the initial CORESET on the selected beam in a Medium Access Control (MAC) Control Element (MAC-CE), wherein the information is transmitted using a combination of bits in the MAC-CE, the bits configured for indicating CORESETs.

Certain aspects provide a method for wireless communication performed by a user equipment (UE). The method generally includes transmitting measurements of at least one downlink reference signal (RS), wherein each of the at least one downlink RS is associated with a transmit beam; receiving information relating to an initial time and frequency control resource set (CORESET) on a beam selected based on the measurements, wherein the information is received in a Medium Access Control (MAC) Control Element (MAC-CE) and is indicated using a combination of bits in the MAC-CE, the bits configured for indicating CORESETs; and monitoring the initial CORESET based on the received information, wherein the initial CORESET schedules unicast Physical Downlink Data Channel (PDSCH) for the UE, and wherein the initial CORESET is identified during initial access of the UE to a serving base station.

Certain aspects provide a method for wireless communication performed by a user equipment (UE). The method generally includes detecting a trigger for beam recovery; selecting a candidate beam from a set of candidate beams configured for the beam recovery; transmitting a random access channel (RACH) signal on RACH resources configured for the selected candidate beam; receiving a RACH response in a first time and frequency control resource set (CORESET) configured for the beam recovery; and based on receiving the RACH response, mapping at least one of a Transmission Configuration Indicator (TCI) and search space associated with the selected candidate beam to an initial CORESET, wherein the initial CORESET is identified during initial access of the UE.

Certain aspects of the present disclosure provide a method for wireless communication by a Base Station (BS). The method generally includes detecting a trigger for beam recovery for a User Equipment (UE); receiving a random access channel (RACH) signal on RACH resources configured for a candidate beam selected by the UE, wherein the candidate beam is one of a set of candidate beams configured for the beam recovery; transmitting a RACH response in a first time and frequency control resource set (CORESET) configured for the beam recovery; mapping at least one of a Transmission Configuration Indicator (TCI) and search space associated with the selected candidate beam to an initial CORESET, wherein the initial CORESET is identified during initial access of the UE; and transmitting on the initial CORESET in a search space associated with the selected candidate beam.

Certain aspects of the present disclosure provide an apparatus for wireless communication by a base station (BS). The apparatus generally includes at least one processor and a memory coupled to the at least one processor. The at least one processor generally configured to receive measurements of at least one downlink reference signal (RS) from a User Equipment (UE), wherein each of the at least one downlink RS is associated with a transmit beam; select, based on the received measurements, a transmit beam for transmitting on resources of an initial time and frequency control resource set (CORESET), wherein the initial CORESET schedules unicast Physical Downlink Data Channel (PDSCH) for the UE, wherein the initial CORESET is identified during initial access of the UE to the BS; and transmit information relating to the initial CORESET on the selected beam in a Medium Access Control (MAC) Control Element (MAC-CE), wherein the information is transmitted using a combination of bits in the MAC-CE, the bits configured for indicating CORESETs.

Certain aspects of the present disclosure provide an apparatus for wireless communication by a user equipment (UE). The apparatus generally includes at least one processor and a memory coupled to the at least one processor. The at least one processor generally configured to transmit measurements of at least one downlink reference signal (RS), wherein each of the at least one downlink RS is associated with a transmit beam; receive information relating to an initial time and frequency control resource set (CORESET) on a beam selected based on the measurements, wherein the information is received in a Medium Access Control (MAC) Control Element (MAC-CE) and is indicated using a combination of bits in the MAC-CE, the bits configured for indicating CORESETs; and monitor the initial CORESET based on the received information, wherein the initial CORESET schedules unicast Physical Downlink Data Channel (PDSCH) for the UE, and wherein the initial CORESET is identified during initial access of the UE to a serving base station.

Certain aspects of the present disclosure provide an apparatus for wireless communication by a user equipment (UE). The apparatus generally includes at least one processor and a memory coupled to the at least one processor. The at least one processor generally configured to detect a trigger for beam recovery; select a candidate beam from a set of candidate beams configured for the beam recovery; transmit a random access channel (RACH) signal on RACH resources configured for the selected candidate beam; receive a RACH response in a first time and frequency control resource set (CORESET) configured for the beam recovery; and based on receiving the RACH response, map at least one of a Transmission Configuration Indicator (TCI) and search space associated with the selected candidate beam to an initial CORESET, wherein the initial CORESET is identified during initial access of the UE.

Certain aspects of the present disclosure provide an apparatus for wireless communication by a base station (BS). The apparatus generally includes at least one processor and a memory coupled to the at least one processor. The at least one processor generally configured to detect a trigger for beam recovery for a User Equipment (UE); receive a random access channel (RACH) signal on RACH resources configured for a candidate beam selected by the UE, wherein the candidate beam is one of a set of candidate beams configured for the beam recovery; transmit a RACH response in a first time and frequency control resource set (CORESET) configured for the beam recovery; map at least one of a Transmission Configuration Indicator (TCI) and search space associated with the selected candidate beam to an initial CORESET, wherein the initial CORESET is identified during initial access of the UE; and transmit on the initial CORESET in a search space associated with the selected candidate beam.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
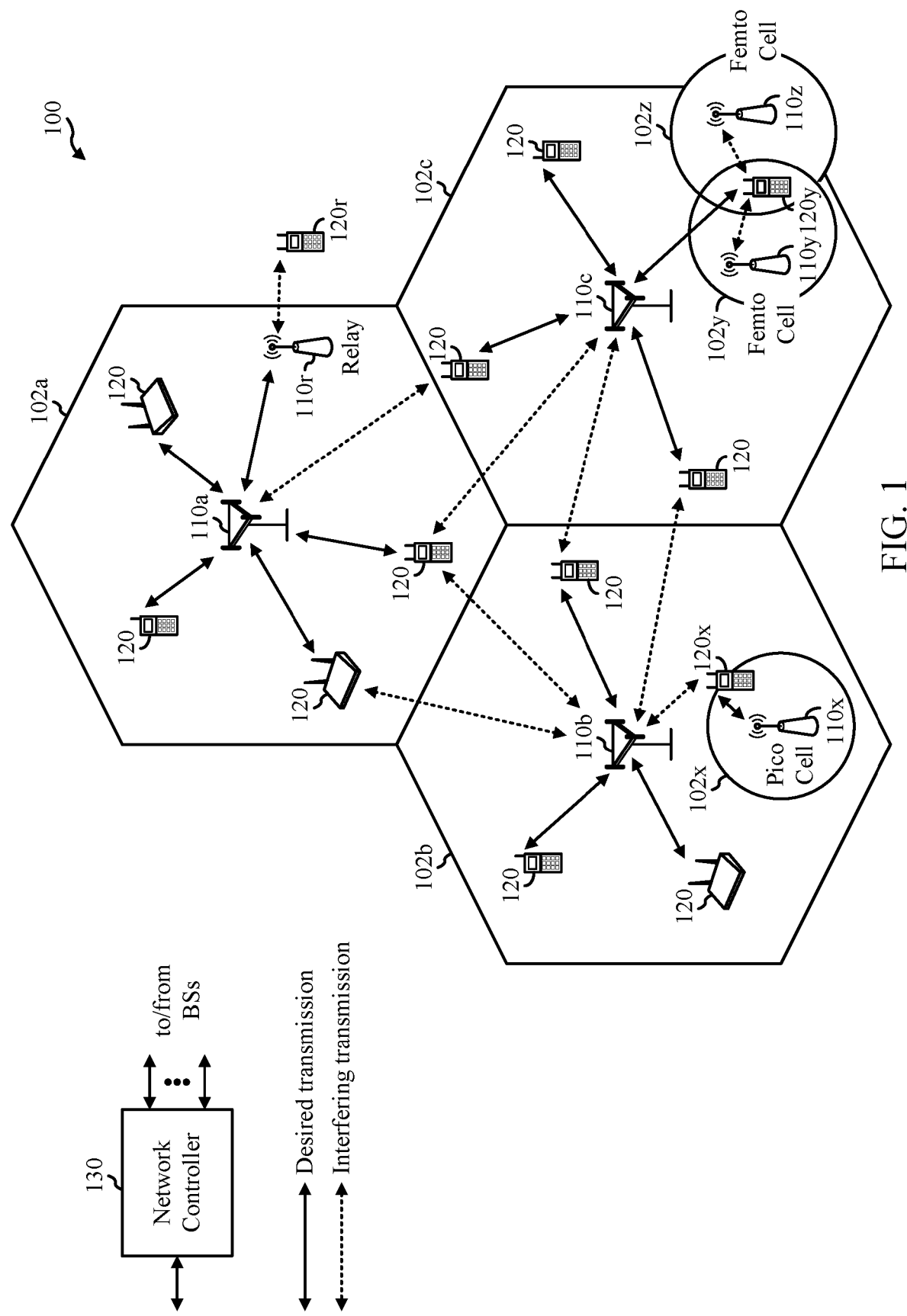
FIG. 1 is a block diagram conceptually illustrating an example telecommunications system, in accordance with certain aspects of the present disclosure.

Aspects of the present disclosure provide apparatus, methods, processing systems, and computer readable mediums for configuring an initial control resource set (CORESET) used for initial access of a network by a UE, such as configuring the initial CORESET during beam management and beam recovery. In certain aspects, the initial CORESET may be referred to as CORESET #0 herein, such as corresponding to CORESET #0 as defined in 3GPP standards defining NR. Further a search space associated with the initial CORESET may be referred to as a search space #0.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. In an aspect, as shown in FIG. 1, each of the BSs 110 may be configured to perform operations related to configuring an initial CORESET and an associated search space, according to aspects described herein. In an aspect, as shown in FIG. 1, each of the User Equipments (UEs) 120 may be configured to perform operations related to configuring an initial CORESET and an associated search space, according to aspects described herein.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
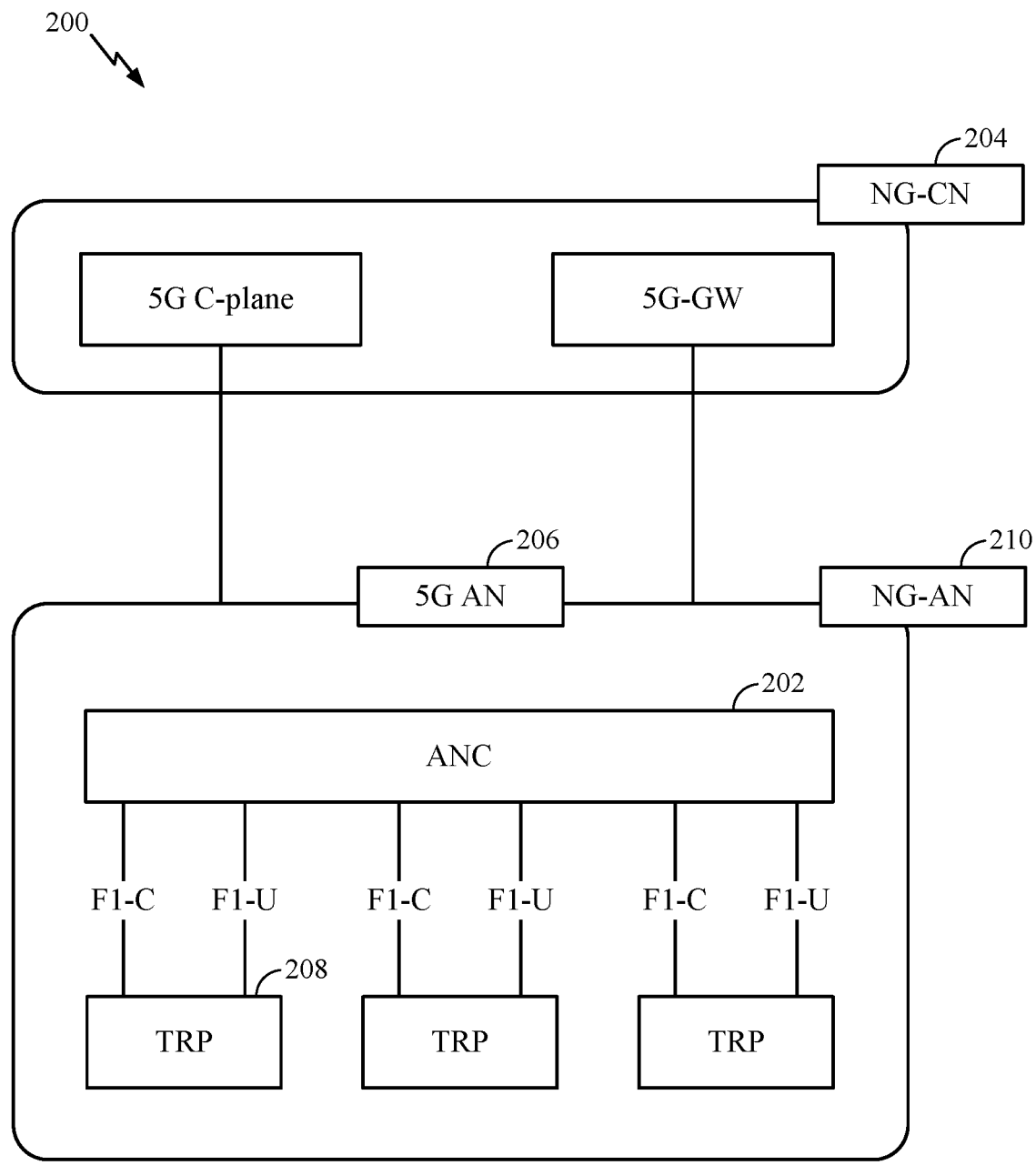
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

In an aspect, 5G access node 206 may also be configured to perform operations related to configuring an initial CORESET and associate search space, according to aspects described herein.

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
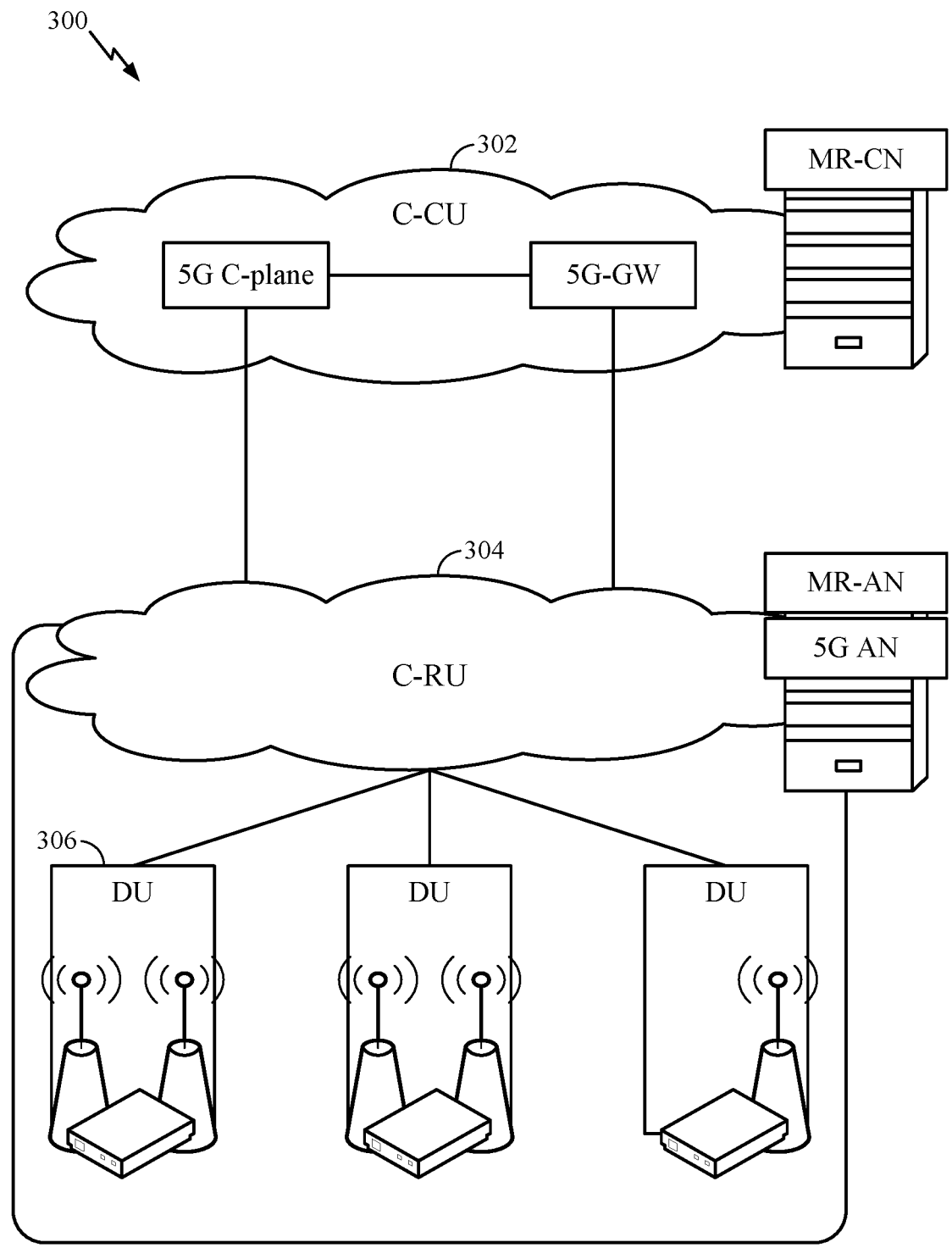
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
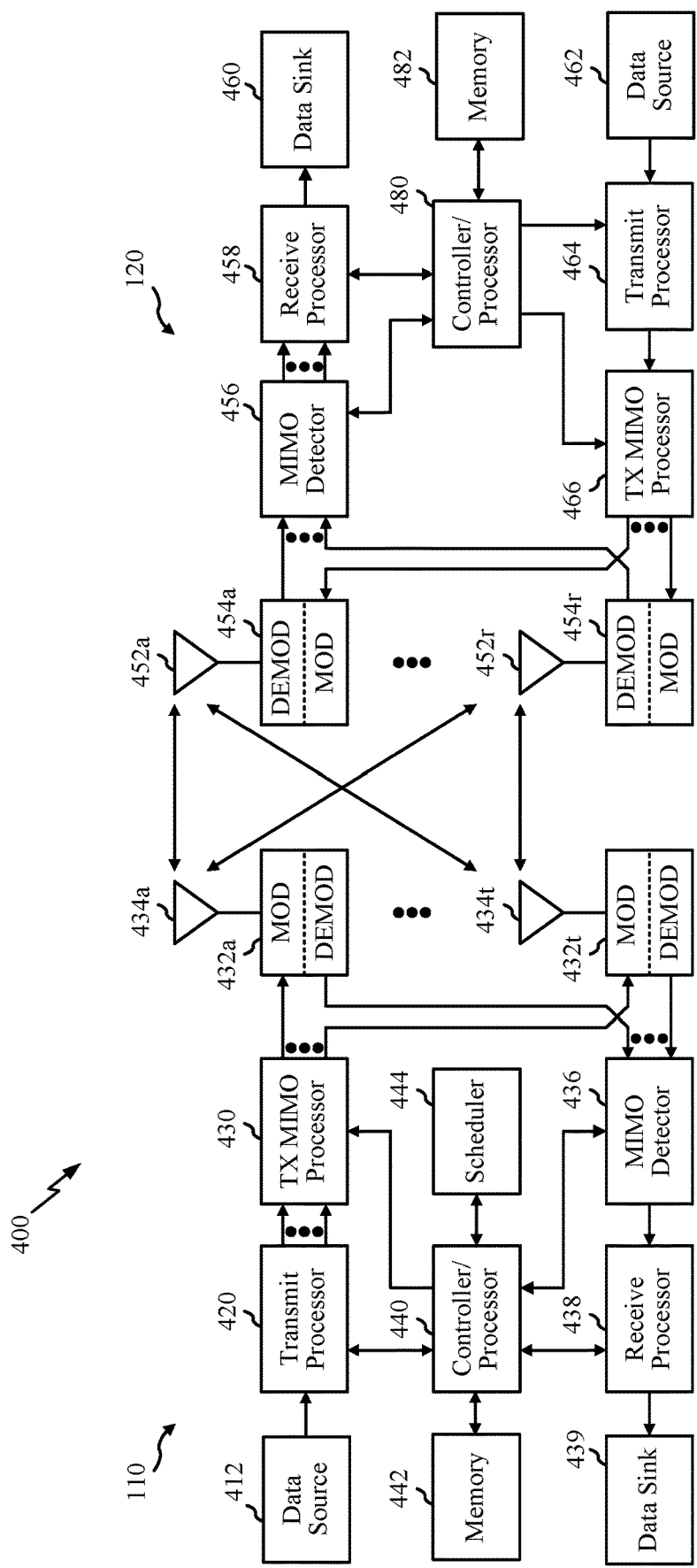
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described in FIGS. 8-11. In an aspect, the BS 110 may be configured to perform operations related to configuring an initial CORESET and related search space, according to aspects described herein. In an aspect, the UE 120 may be configured to configuring an initial CORESET and related search space, according to aspects described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
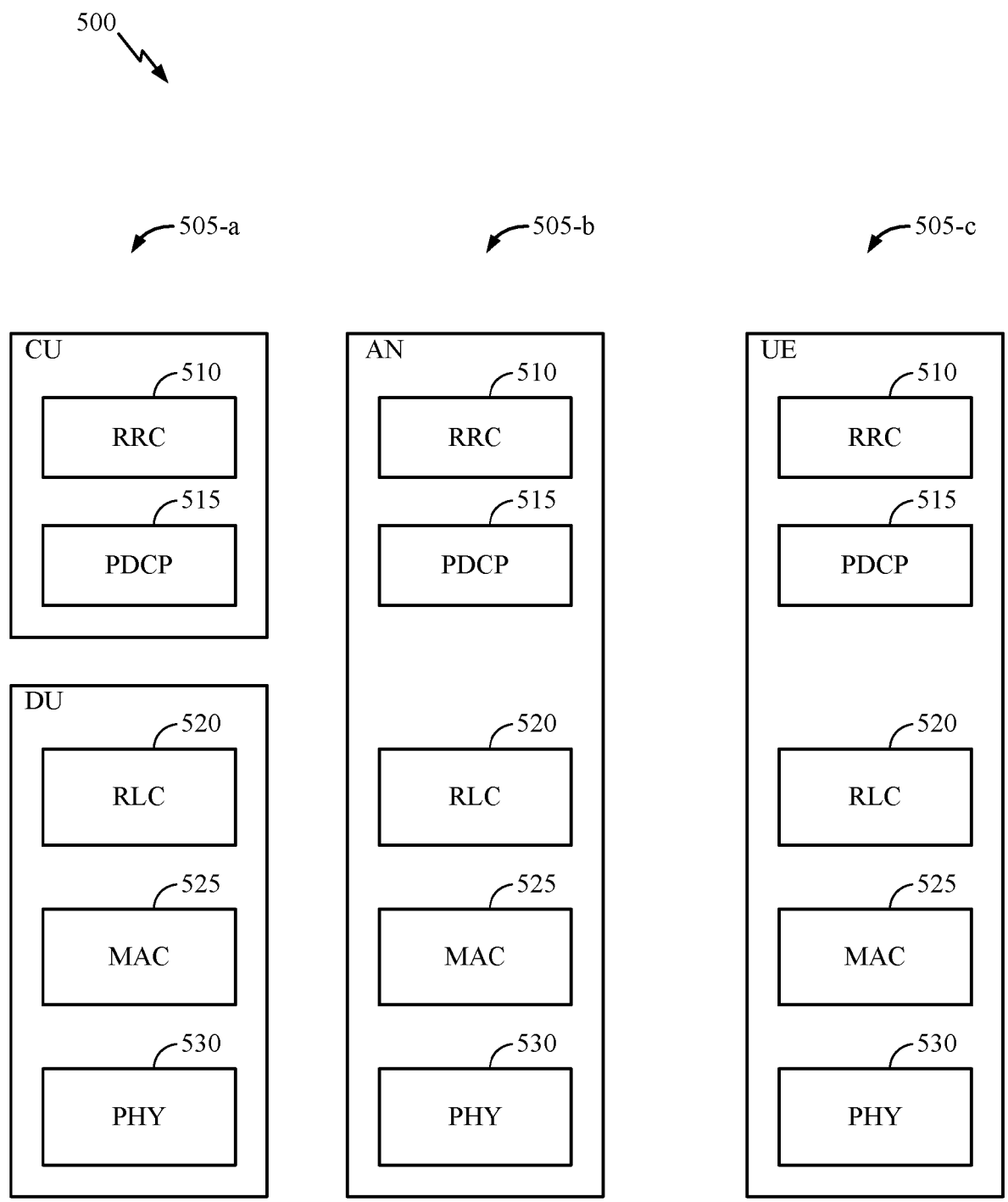
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
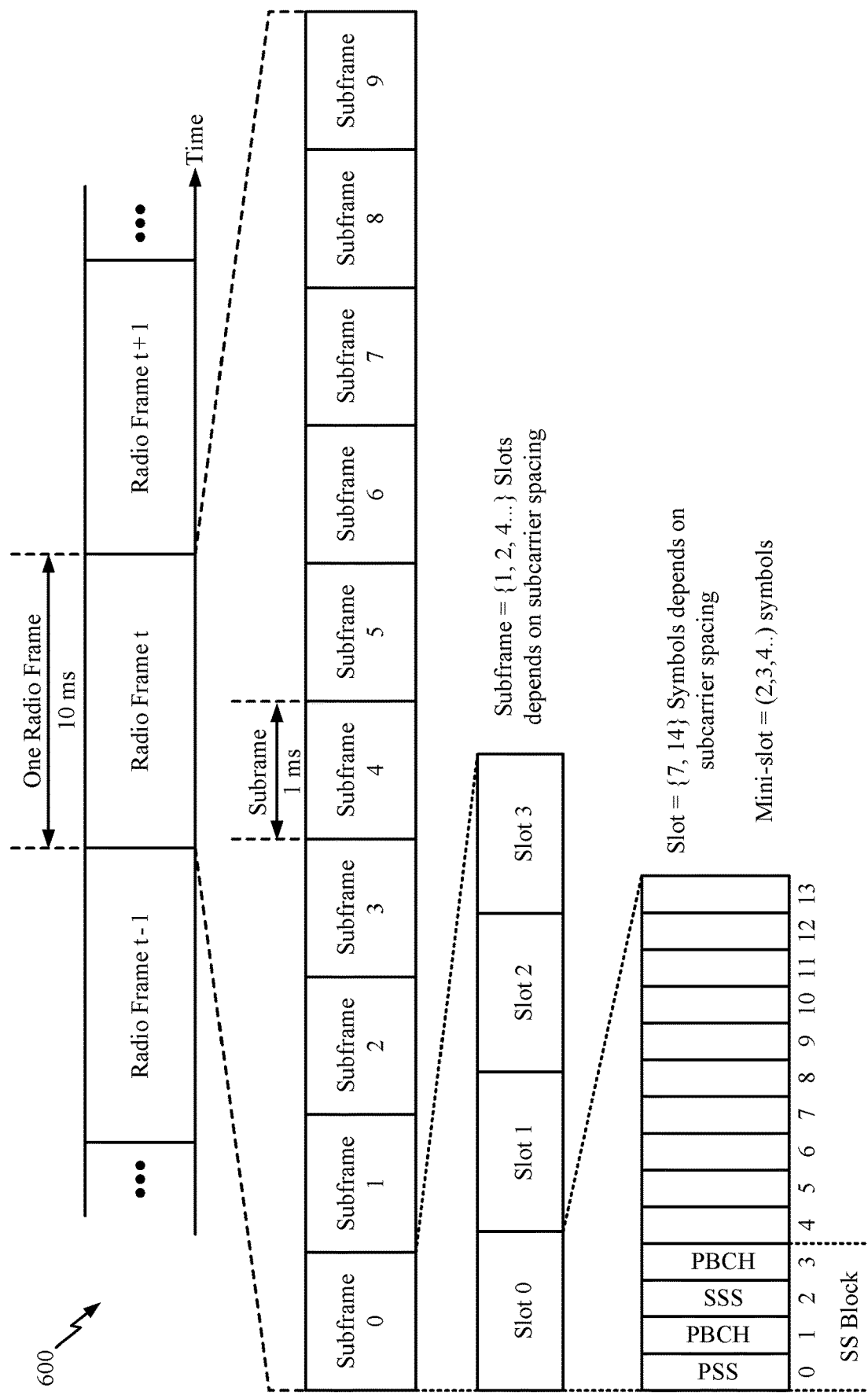
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

A control resource set (CORESET) for an OFDMA system (e.g., a communications system transmitting PDCCH using OFDMA waveforms) may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Operating characteristics of a NodeB or other base station in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP web site.

As described above, a CORESET is a set of time and frequency domain resources configured for conveying PDCCH within the system bandwidth. A UE determines a CORESET and monitors the CORESET for control channels. When the UE detects a control channel in the CORESET, the UE attempts to decode the control channel and communicates with the transmitting BS (e.g., the transmitting cell) according to the control data in the control channel.

According to aspects of the present disclosure, when a UE is connected to a cell, the UE may receive a master information block (MIB) in a synchronization signal and physical broadcast channel (SS/PBCH) block (e.g., in the PBCH of the SS/PBCH block) on a synchronization raster (sync raster), which may correspond to a SSB. From the frequency of the sync raster, the UE may determine an operating band of the cell, from which the UE may determine a minimum channel bandwidth and a subcarrier spacing (SCS) of the channel. The UE may then determine an index from the MIB (e.g., four bits in the MIB, conveying an index in a range 0-15). The UE may look up a CORESET configuration from a single table of CORESET configurations, with various subsets of the indices indicating valid CORESET configurations for various combinations of minimum channel bandwidth and SCS. That is, each combination of minimum channel bandwidth and SCS may be mapped to a subset of indices in the table. Alternatively, the UE may select a search space CORESET configuration table from several tables of CORESET configurations, based on the minimum channel bandwidth and SCS. The UE may then look up a CORESET configuration (e.g., a Type0-PDCCH search space CORESET configuration) from the selected table, based on the index. After determining the CORESET configuration from the single table or the selected table, the UE may then determine the CORESET to be monitored (as mentioned above) based on the location (in time and frequency) of the SS/PBCH block and the CORESET configuration.

Figure 7:
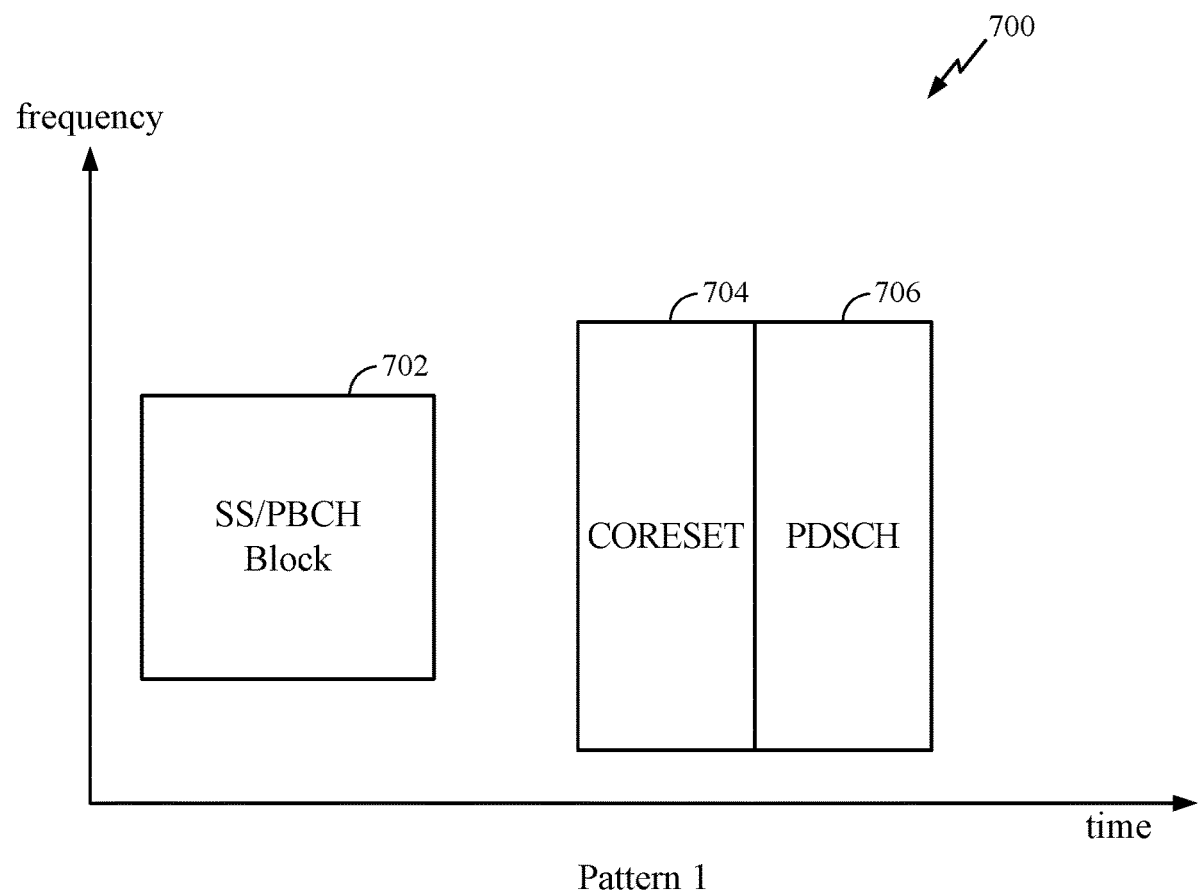
FIG. 7 shows an exemplary transmission resource mapping, according to aspects of the present disclosure.

FIG. 7 shows an exemplary transmission resource mapping 700, according to aspects of the present disclosure. In the exemplary mapping, a BS (e.g., BS 110a, shown in FIG. 1) transmits an SS/PBCH block 702. The SS/PBCH block includes a MIB conveying an index to a table that relates the time and frequency resources of the CORESET 704 to the time and frequency resources of the SS/PBCH block. The BS transmits a PDCCH to a UE (e.g., UE 120, shown in FIG. 1) in the CORESET, and the PDCCH schedules a PDSCH 706. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was allocated by the PDCCH.

Below are exemplary search space CORESET configuration tables from "Physical layer procedures for control" TS 38.213, Release 15, which is available from the 3GPP website.

TABLE 13-1

Set of resource blocks and slot symbols of control resource set for Type0-PDCCH search space when {SS/PBCH block, PDCCH} subcarrier spacing is {15, 15} kHz with minimum channel bandwidth 5 MHz

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

TABLE 13-2

Set of resource blocks and slot symbols of control resource set for Type0-PDCCH search space when {SS/PBCH block, PDCCH} subcarrier spacing is {15, 30} kHz with minimum channel bandwidth 5 MHz

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 6 |
| 1 | 1 | 24 | 2 | 7 |
| 2 | 1 | 24 | 2 | 8 |
| 3 | 1 | 24 | 3 | 6 |
| 4 | 1 | 24 | 3 | 7 |
| 5 | 1 | 24 | 3 | 8 |
| 6 | 1 | 48 | 1 | 18 |
| 7 | 1 | 48 | 1 | 20 |
| 8 | 1 | 48 | 2 | 18 |
| 9 | 1 | 48 | 2 | 20 |
| 10 | 1 | 48 | 3 | 18 |
| 11 | 1 | 48 | 3 | 20 |
| 12 | Reserved | | | |
| 13 | Reserved | | | |
| 14 | Reserved | | | |
| 15 | Reserved | | | |

Example Signaling of Coreset 0 and Search Space 0 in Nr

CORESET #0 (e.g., CORESET ID 0) in NR is identified during initial access of a UE. ControlResourceSet information element (IE) (also referred to as CORESET IE) is an RRC IE which generally includes information regarding a CORESET configured for a UE. The CORESET IE generally includes one or more of information regarding a CORESET ID, frequency domain resources (e.g., number of RBs) assigned to the CORESET, contiguous time duration of the CORESET in a number of symbols, and Transmission Configuration Indicator (TCI) states, etc. In an aspect, the TCI states includes a subset of TCI states used for providing Quasi colocation (QCL) relationships between the DL RS(s) in one RS set (e.g., TCI-Set) and the PDCCH demodulation RS (DMRS) ports. In an aspect, a particular TCI state for a given UE (e.g., for unicast PDCCH) is conveyed to the UE by the Medium Access Control (MAC) Control Element (MAC-CE). The particular TCI state is generally selected from the set of TCI states conveyed by the CORESET IE. The CORESET is generally configured via MIB.

The SearchSpace IE is another RRC IE that defines how and where to search for PDCCH candidates for a given CORESET. Each search space is associated with one CORESET. The SearchSpace IE identifies a search space configured for a CORESET by a search space ID. In an aspect, the search space ID associated with CORESET #0 is SearchSpace ID #0. The search space is generally configured via PBCH (MIB).

A unique aspect of CORESET #0, unlike other CORESETs, is that the interpretation of the TCI state and time domain configuration changes from UE to UE, based on the SSB index which is used for initial access.

CORESET #0 may be used to schedule unicast PDSCH. In this context, a potential problem is how to transmit signaling to a UE on CORESET #0 in its associated Search Space #0 when the original beam acquired by the UE during initial access is no longer available, and thus, how to ensure that a serving gNB and a served UE are in sync.

In certain aspects, this problem may present itself in two scenarios including beam management and beam recovery.

Certain aspects of the present disclosure describe methods for determining an appropriate beam for configuring CORESET #0 during beam management and beam recovery scenarios.

In certain aspects, for the beam management scenario, a MAC-CE based scheme may be used to determine a beam for configuring CORESET #0.

Figure 8:
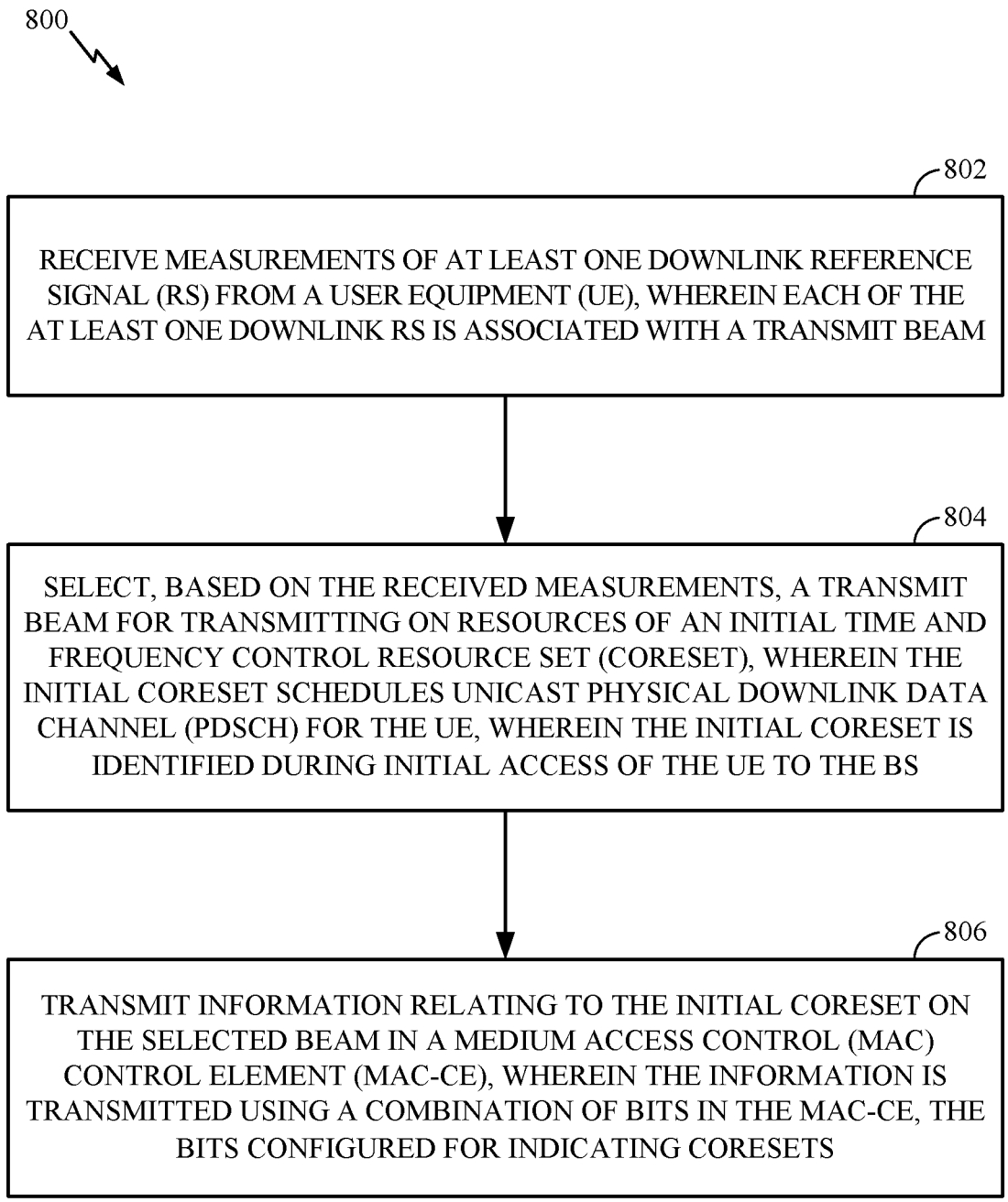
FIG. 8 illustrates example operations performed by a base station (e.g., gNB) for determining a beam for CORESET #0, in accordance with certain aspects of the present disclosure.

FIG. 8 illustrates example operations 800 performed by a base station (e.g., gNB) for determining a beam for CORESET #0, in accordance with certain aspects of the present disclosure.

Operations 800 begin, at 802, by receiving measurements of at least one downlink reference signal (RS) from a UE, wherein each of the at least one downlink RS is associated with a transmit beam. In an aspect, the at least one downlink RS includes at least one of one or more SSBs, one or more CSI-RSs, or a combination thereof.

At 804, the BS selects, based on the received measurements, a transmit beam for transmitting on resources of an initial CORESET, wherein the initial CORESET schedules unicast PDSCH for the UE, and wherein the initial CORESET is identified during initial access of the UE to the BS. In an aspect, the initial CORESET is CORESET ID #0.

At 806, the BS transmits information relating to the initial CORESET on the selected beam in the MAC-CE, wherein the information is transmitted using a combination of bits in the MAC-CE, the bits configured for indicating CORESETs.

Figure 9:
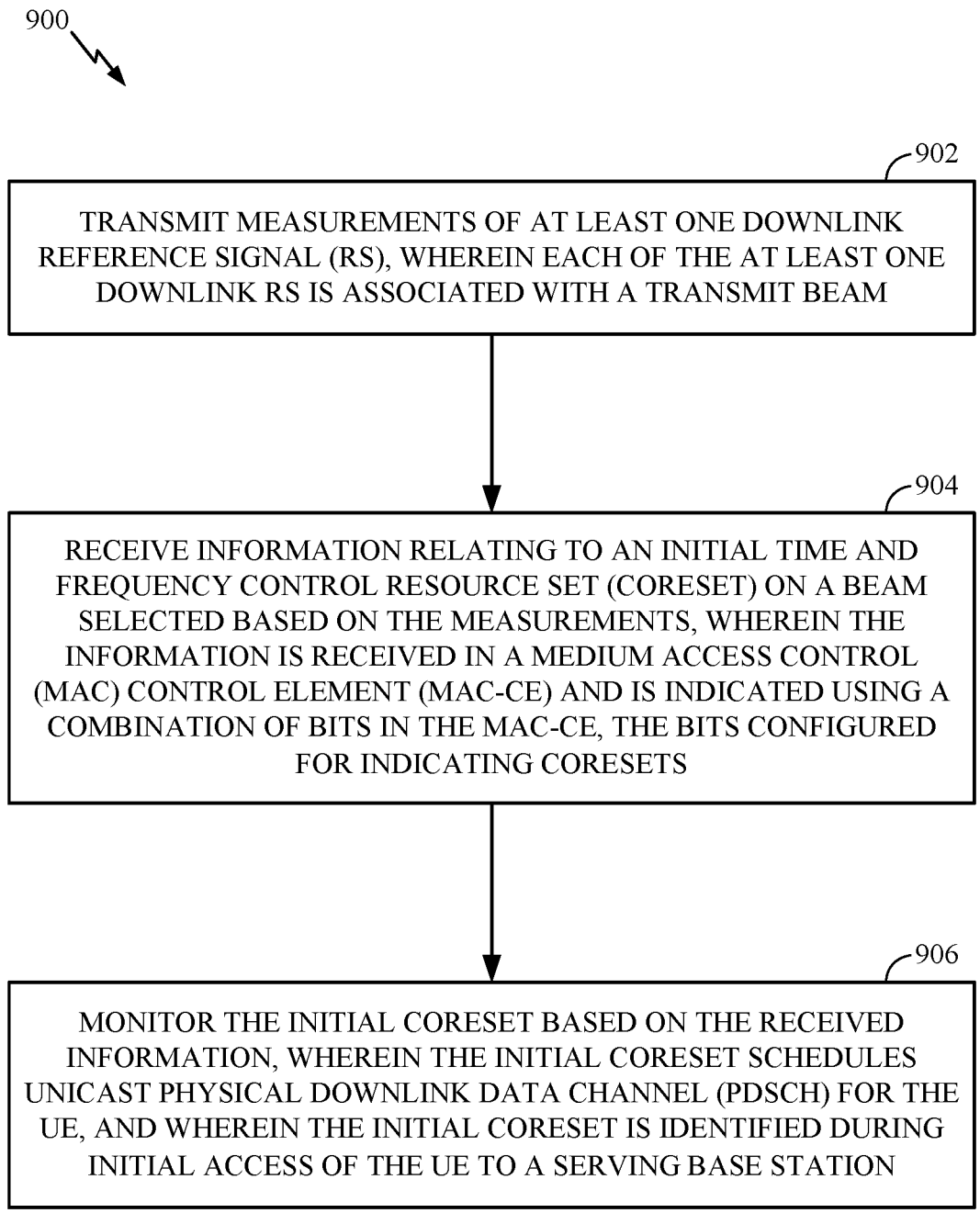
FIG. 9 illustrates example operations performed by a UE for determining a beam to receive signaling on CORESET #0, in accordance with certain aspects of the present disclosure.

FIG. 9 illustrates example operations 900 performed by a UE for determining a beam to receive signaling on CORESET #0, in accordance with certain aspects of the present disclosure.

Operations 900, being at, 902, by transmitting measurements of at least one downlink reference signal (RS), wherein each of the at least one downlink RS is associated with a transmit beam. In an aspect, the at least one downlink RS includes at least one of one or more SSBs, one or more CSI-RSs, or a combination thereof.

At 904, the UE receives information relating to an initial CORESET on a beam selected based on the measurements, wherein the information is received in a MAC-CE and is indicated using a combination of bits in the MAC-CE, the bits configured for indicating CORESETs. At 906, the UE monitors the initial CORESET based on the received information, wherein the initial CORESET schedules unicast PDSCH for the UE, and wherein the initial CORESET is identified during initial access of the UE to a serving base station. In an aspect, the initial CORESET is CORESET ID #0.

In certain aspects, during beam management the gNB commands the UE to report measurements relating to SSBs (or CSI-RSs). Each SSB/CSI-RS is transmitted on a particular beam and measurements of the SSB/CSI-RS indicate a quality of the respective beam on which the UE received the SSB/CSI-RS. In an aspect, the measurement results for the SSB/CSI-RS include Receive Signal Received Power (RSRP). The gNB makes a determination of an appropriate beam for CORESET 0 based on the reported beam measurements. For example, the gNB may select a transmit beam if it's reported RSRP is higher than a configured threshold RSRP or if it has the highest RSRP among the measured transmit beams.

The gNB then indicates the configuration of CORESET #0 for the selected beam via MAC-CE. In certain aspects, M bits (e.g., M=2) are assigned in the MAC-CE format for indicating CORESETs, a combination of the M bits indicating a CORESET configured on the respective beam. However, in an aspect, as per the 5G NR standards, a maximum of three CORESETS per Bandwidth Part (BWP) is allowed. Thus, for M=2, only three of the four possible combination of the two bits may be used for indicating CORESETS. In an aspect, the gNB may use the fourth, unused bit combination to indicate to the UE the configuration of CORESET 0 on the selected beam.

In certain aspects, the MAC-CE includes information regarding, a BWP ID, a CORESET ID of the configured CORESET and a TCI state ID associated with the CORESET (e.g., selected from a set of TCI states configured by RRC signaling).

In an aspect, the CORESET ID field of the MAC CE indicates CORESET ID #0. In an aspect, the MAC-CE updates the TCI for CORESET #0. In an aspect, the TCI state ID field/bits (e.g., 6 bits) in the MAC-CE indicates SSB index instead of the TCI state. Thus, the search space for CORESET ID #0 is modified based on the SSB index. This change in search space is an indirect consequence of the SSB index indication in the TCI state field. Thus, both the gNB and the UE will switch to the search space #0 of the indicated SSB for unicast data (e.g., PDSCH data).

In certain aspects, for the beam recovery scenario, an autonomous (e.g., UE autonomous) scheme may be specified to determine a beam for configuring CORESET #0.

Figure 10:
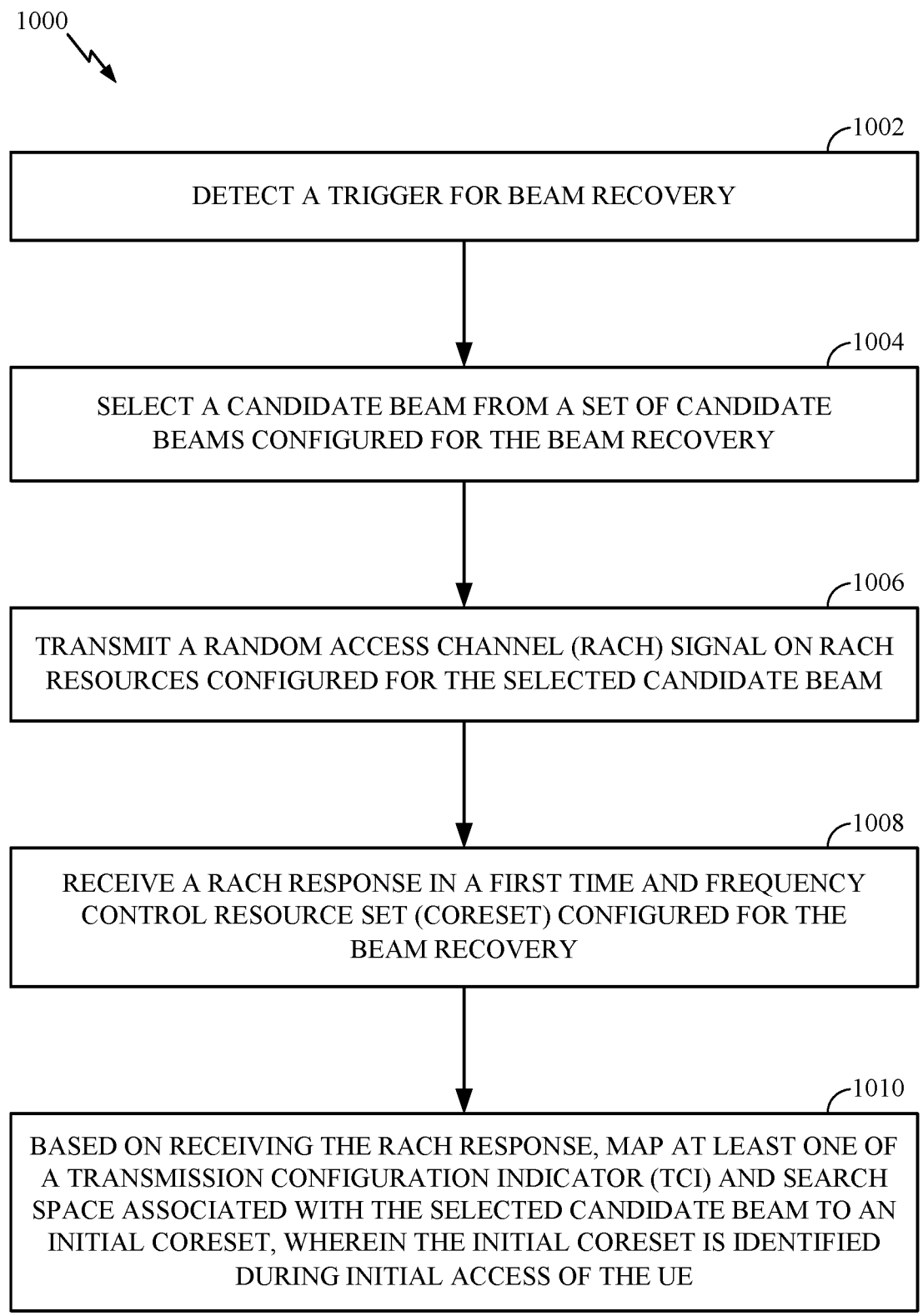
FIG. 10 illustrates example operations performed by a UE for determining a beam for receiving signaling in CORESET #0, in accordance with certain aspects of the present disclosure.

FIG. 10 illustrates example operations 1000 performed by a UE for determining a beam for receiving signaling in CORESET #0, in accordance with certain aspects of the present disclosure.

Operations 1000 begin, at 1002, by detecting a trigger for beam recovery. At 1004, the UE selects a candidate beam from a set of candidate beams configured for the beam recovery. At 1006, the UE transmits a RACH signal on RACH resources configured for the selected candidate beam. At 1008, the UE receives a RACH response in a first CORESET (e.g., recovery CORESET) configured for the beam recovery. At 1010, the UE, based on receiving the RACH response, maps at least one of a TCI or a search space associated with the selected candidate beam to an initial CORESET, wherein the initial CORESET is identified during initial access of the UE. In an aspect, the initial CORESET is CORESET ID #0.

Figure 11:
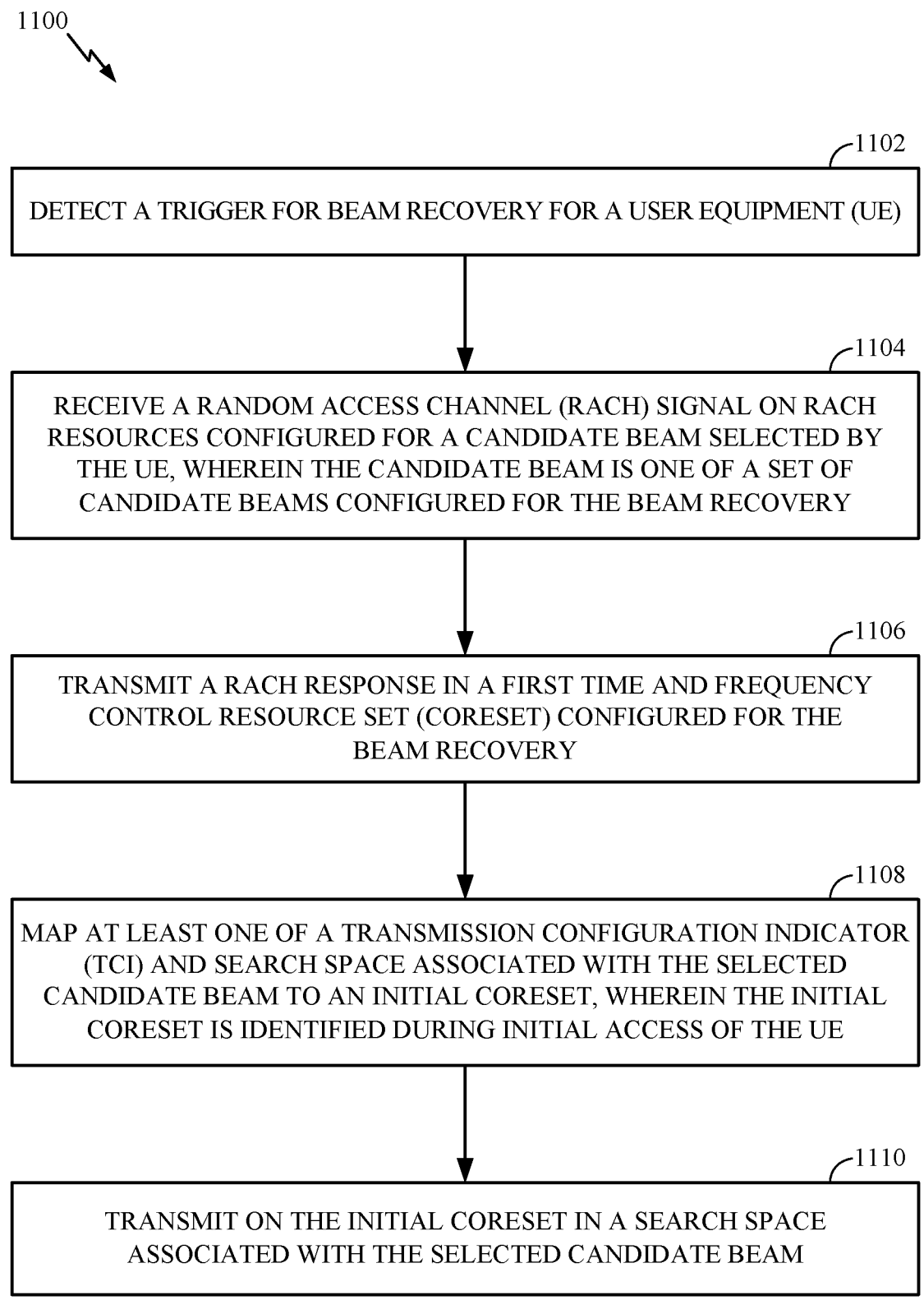
FIG. 11 illustrates example operations performed by a BS (e.g., gNB) for determining a beam for CORESET #0, in accordance with certain aspects of the present disclosure.

FIG. 11 illustrates example operations 1100 performed by a BS (e.g., gNB) for determining a beam for CORESET #0, in accordance with certain aspects of the present disclosure.

Operations 1100 begin, at 1102, by detecting a trigger for beam recovery for a UE. At 1104 the BS receives a random access channel (RACH) signal on RACH resources configured for a candidate beam selected by the UE, wherein the candidate beam is one of a set of candidate beams configured for the beam recovery. At 1106, the BS transmits a RACH response in a first CORESET configured for the beam recovery. At 1108, the BS maps at least one of a TCI or a search space associated with the selected candidate beam to an initial CORESET, wherein the initial CORESET is identified during initial access of the UE. At 1110, the BS transmits on the initial CORESET in a search space associated with the selected candidate beam. In an aspect, the initial CORESET is CORESET ID #0.

In certain aspects, the UE is configured with Beam failure recovery configuration via RRC signaling, for example, via BeamFailureRecoveryConfig IE. The BeamFailureRecoveryConfig IE is generally used to configure the UE with RACH resources and candidate beams for beam failure recovery in case of beam failure detection. The beam failure recovery configuration generally includes a candidate beam list including a list of reference signals (e.g., SSB and/or CSI-RS) identifying the one or more candidate beams for recovery and associated Random Access (RA) parameters. The recovery configuration further includes one or more candidate beam thresholds including one or more RSRP thresholds used for determining whether a candidate beam may be used by the UE to attempt contention free Random Access to recover from beam failure. The candidate beam threshold may be the same for each candidate beam or different for different candidate beams. The recovery configuration further indicates RACH resources (e.g., RACH occasions) associated with each reference signal/beam (for transmission of RACH signals on a selected beam), and may indicate a recovery CORESET along with a recovery search space that the UE may use to receive a random access response for beam failure recovery. If no recovery CORESET is explicitly indicated, CORESET 0 may be implicitly used as the recovery CORESET.

In certain aspects, as part of the beam recovery, the UE identifies a set of current beams (q0) (e.g., a configured set of beams for the UE) and measures reference signals (e.g., SSB and/or CSI-RS) received on each of the beams in the set q0. The UE compares RSRPs for each current beam with a threshold RSRP. The threshold RSRP may be the same for each beam q0 or different for different beams q0. Further, the threshold RSRP may be the same or different than the candidate beam threshold(s).

Additionally, the UE identifies a set of candidate beams (q1) $\overline{q_1}$ configured for beam recovery, for example, based on the beam failure recovery configuration. The UE measures reference signals (e.g., SSB and/or CSI-RS) associated with each candidate beam. The UE compares RSRP for each candidate beam with the corresponding candidate beam threshold from the recovery configuration.

In an aspect, if the UE determines that each of the measured current beams is below the required threshold RSRP, the UE attempts to select one of the candidate beams for the recovery. In an aspect, the UE selects a candidate beam that satisfies the recovery RSRP threshold. In certain aspects, the UE selects the candidate beam with the best RSRP.

The UE then sends a RACH signal on RACH resources configured for the selected candidate beam in the recovery configuration.

The UE then monitors the recovery search space for the recovery CORESET for the selected candidate beam to receive a RACH response from the gNB.

In certain aspects, if the UE receives a RACH response, the UE maps at least one of the TCI or the search space associated with the selected candidate beam to CORESET #0. In an aspect the UE monitors the search space associated with the selected candidate beam for CORESET #0.

In an aspect, the RACH response is received in a Downlink control Information (DCI) message of Random Access (RA) Message 2. In an aspect, the RACH response received in Message 2 is scrambled with a cell radio network temporary identifier (C-RNTI) associated with the UE.

In an aspect, the RACH response is received in DCI of RA Message 4. In an aspect, the RACH response received in Message 4 is scrambled with a cell radio network temporary identifier (C-RNTI) associated with the UE. In, an aspect, the RACH response is received by contention resolution.

In an aspect, the at least one of the TCI and the search space associated with the selected candidate beam are associated with a SSB associated with the selected candidate beam. In an aspect, the selected candidate beam on which the RACH response is received is now associated with CORESET #0 and the search space #0 is interpreted accordingly based on the selected candidate beam (e.g., based on the associated SSB). In an aspect, if the selected candidate beam is associated with CSI-RS, then CORESET #0/Search Space #0 is updated with SSB associated with the CSI-RS.

In an aspect, UE assumes that the CORESET ID #0 and search space ID #0 identified during initial access are now associated with the SS/PBCH block quasi co-located with the RS associated with the selected beam index, after completion of beam recovery.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a Base Station (BS), comprising:
    receiving measurements of at least one downlink reference signal (RS) from a User Equipment (UE), wherein each of the at least one downlink RS is associated with a transmit beam;
    selecting, based on the received measurements, a transmit beam for transmitting on resources of an initial time and frequency control resource set (CORESET), wherein the initial CORESET schedules unicast Physical Downlink Data Channel (PDSCH) for the UE, wherein the initial CORESET is identified during initial access of the UE to the BS;
    transmitting information relating to the initial CORESET on the selected beam in a Medium Access Control (MAC) Control Element (MAC-CE), wherein the information is transmitted using a combination of bits in the MAC-CE, the bits configured for indicating CORESETs; and
    transmitting an index of a Synchronization Signal Block (SSB) in a Transmission Configuration Indicator (TCI) field of the MAC-CE, the index of the SSB associated with a search space for searching on the initial CORESET by the UE.

2. The method of claim 1, wherein the initial CORESET corresponds to a CORESET Identifier (ID) #0.

3. The method of claim 1, wherein the combination of bits consists of 2-bits for indicating four possible CORESETs for a given Bandwidth Part (BWP).

4. The method of claim 1, wherein the at least one downlink RS includes at least one of one or more SSBs, one or more Channel State Information Reference Signals (CSI-RSs), or a combination thereof.

5. A method of wireless communications by a User Equipment (UE), comprising:
transmitting measurements of at least one downlink reference signal (RS), wherein each of the at least one downlink RS is associated with a transmit beam;
receiving information relating to an initial time and frequency control resource set (CORESET) on a beam selected based on the measurements, wherein the information is received in a Medium Access Control (MAC) Control Element (MAC-CE) and is indicated using a combination of bits in the MAC-CE, the bits configured for indicating CORESETs;
receiving an index of a Synchronization Signal Block (SSB) in a Transmission Configuration Indicator (TCI) field of the MAC-CE, the index of the SSB associated with a search space for searching on the initial CORESET by the UE; and
monitoring the initial CORESET based on the received information and the received index, wherein the initial CORESET schedules unicast Physical Downlink Data Channel (PDSCH) for the UE, and wherein the initial CORESET is identified during initial access of the UE to a serving base station.

6. The method of claim 5, wherein the initial CORESET corresponds to a CORESET Identifier (ID) #0.

7. The method of claim 5, wherein the combination of bits consists of 2-bits for indicating four possible CORESETs for a given Bandwidth Part (BWP).

8. The method of claim 5, wherein monitoring the initial CORESET includes monitoring the initial CORESET in the search space associated with the index of the SSB.

9. The method of claim 5, wherein the at least one downlink RS includes at least one of one or more SSBs, one or more Channel State Information Reference Signals (CSI-RSs), or a combination thereof.

10. An apparatus for wireless communication by a Base Station (BS), comprising:
at least one processor configured to:
receive measurements of at least one downlink reference signal (RS) from a User Equipment (UE), wherein each of the at least one downlink RS is associated with a transmit beam;
select, based on the received measurements, a transmit beam for transmitting on resources of an initial time and frequency control resource set (CORESET), wherein the initial CORESET schedules unicast Physical Downlink Data Channel (PDSCH) for the UE, wherein the initial CORESET is identified during initial access of the UE to the BS; and
transmit information relating to the initial CORESET on the selected beam in a Medium Access Control (MAC) Control Element (MAC-CE), wherein the information is transmitted using a combination of bits in the MAC-CE, the bits configured for indicating CORESETs; and
transmit an index of a Synchronization Signal Block (SSB) in a Transmission Configuration Indicator (TCI) field of the MAC-CE, the index of the SSB associated with a search space for searching on the initial CORESET by the UE; and
a memory coupled to the at least one processor.

11. The apparatus of claim 10, wherein the initial CORESET corresponds to a CORESET Identifier (ID) #0.

12. The apparatus of claim 10, wherein the at least one downlink RS includes at least one of one or more SSBs, one or more Channel State Information Reference Signals (CSI-RSs), or a combination thereof.

13. An apparatus of wireless communications by a User Equipment (UE), comprising:
at least one processor configured to:
transmit measurements of at least one downlink reference signal (RS), wherein each of the at least one downlink RS is associated with a transmit beam;
receive information relating to an initial time and frequency control resource set (CORESET) on a beam selected based on the measurements, wherein the information is received in a Medium Access Control (MAC) Control Element (MAC-CE) and is indicated using a combination of bits in the MAC-CE, the bits configured for indicating CORESETs;
receive an index of a Synchronization Signal Block (SSB) in a Transmission Configuration Indicator (TCI) field of the MAC-CE, the index of the SSB associated with a search space for searching on the initial CORESET by the UE; and
monitor the initial CORESET based on the received information and the received index, wherein the initial CORESET schedules unicast Physical Downlink Data Channel (PDSCH) for the UE, and wherein the initial CORESET is identified during initial access of the UE to a serving base station; and
a memory coupled to the at least one processor.

14. The apparatus of claim 13, wherein the initial CORESET corresponds to a CORESET Identifier (ID) #0.

* * * * *